(12) United States Patent  
Lin

(10) Patent No.: US 6,599,006 B1
(45) Date of Patent: Jul. 29, 2003

(54) STRUCTURE OF A CONTROL SWITCH FOR A FOOD PROCESSOR

(76) Inventor: Chun-Liang Lin, PO Box 82-144, Taipei (TW)

( * ) Notice: Subject to any disclaimer, the term of this patent is extended or adjusted under 35 U.S.C. 154(b) by 0 days.

(21) Appl. No.: 10/270,619

(22) Filed: Oct. 16, 2002

(51) Int. Cl.$^7$ .............. A23L 1/00; A47J 27/00; A47J 43/07; B01F 13/04; B01F 7/16
(52) U.S. Cl. .............. 366/206; 99/335; 99/348; 366/197; 366/205; 366/314; 366/601
(58) Field of Search .............. 99/326–335, 348, 99/468, 492, 509–511; 366/197, 199, 205, 206, 314, 601; 241/199.12, 282.2, 282.1; 310/62; 318/443, 811, 772; 361/195–203; 700/90; 219/492, 494, 442, 506

(56) References Cited

U.S. PATENT DOCUMENTS

| 3,175,594 A | * | 3/1965 | Jepson et al. ........... 366/205 X |
| 3,493,214 A | * | 2/1970 | Edwards et al. ......... 241/282.2 |
| 3,493,215 A | * | 2/1970 | Edwards et al. ......... 241/282.2 |
| 3,548,280 A | * | 12/1970 | Cockroft .................... 318/443 |
| 4,107,791 A | * | 8/1978 | Mikituk .................... 366/205 |
| 4,887,909 A | * | 12/1989 | Bennett ................ 366/601 X |
| 5,720,552 A | * | 2/1998 | Schindlegger ............ 366/197 |
| 5,799,567 A | * | 9/1998 | Dorner ........................ 99/348 |
| 5,809,872 A | * | 9/1998 | Sundquist ................... 99/492 |
| 6,092,922 A | * | 7/2000 | Kett et al. ................. 366/205 |
| 6,112,649 A | * | 9/2000 | Jeong ......................... 99/492 |
| 6,289,793 B1 | * | 9/2001 | Hu et al. ..................... 99/332 |
| 6,402,365 B1 | * | 6/2002 | Wong ......................... 366/206 |

* cited by examiner

Primary Examiner—Timothy F. Simone
(74) Attorney, Agent, or Firm—Leong C. Lei

(57) ABSTRACT

An improved structure of a control switch for a food processor having a fully automatic control key and a disc-type rotating switch mounted with a stop button, speed I button, speed II button, and an instantaneous speed button is disclosed. The fully automatic control key is preset by means of an IC program located within the center position of the rotating shaft of the rotating switch and is controllable by pressing of the key, the logic mechanism of the operation includes a start action, in operation by pressing the key; a fast and slow setting, an instantaneous setting, in operation in rotating, stopping, rotating and stopping sequence; a stop action, including automatic stopping after operation has been completed and stopping action when the stop button is pressed; and a timing setting, allowing time setting of start action, fast speed rotation, slow speed rotation, instantaneous speed rotation, and stop rotation, and the timing of setting is in the sequence of fast speed rotation, slow speed rotation and instantaneous speed rotation.

3 Claims, 4 Drawing Sheets

STRUCTURE OF A CONTROL SWITCH FOR A FOOD PROCESSOR

BACKGROUND OF THE INVENTION 1. (a) Technical Field of the Invention

The present invention relates to an improved structure of a control switch, and in particular, a control switch for use in food processor, juice blender, etc.

2. (b) Description of the Prior Art

FIG. 1 shows a conventional stepless switch having a plurality of buttons controlling a certain rotating speed. The control switch A1 includes stop, speed control button and an instantaneous speed button. The control switch is not convenient as individual speed has to be controlled individually and the operation has to be monitored. The stop button of the food processor has to be pressed so as to stop the rotation of the food processor and the user has to focus during the course of food processing.

Accordingly, a main object of the present invention is to provide an improved structure of a control switch for a food processor, which overcomes the above-mentioned drawback.

SUMMARY OF THE INVENTION

Accordingly, it is an object of the present invention to provide an improved structure of a control switch for a food processor having a fully automatic control key and a disc-type rotating switch mounted with a stop button, speed I button, speed II button, and an instantaneous speed button, characterized in that the fully automatic control key is preset by means of an IC program located within the center position of the rotating shaft of the rotating switch and is controllable by pressing of the key, the logic mechanism of the operation includes a start action, in operation by pressing the key; a fast and slow setting, an instantaneous setting, in operation in rotating, stopping, rotating and stopping sequence; a stop action, including automatic stopping after operation has been completed and stopping action when the stop button is pressed; and a timing setting, allowing time setting of start action, fast speed rotation, slow speed rotation, instantaneous speed rotation, and stop rotation, and the timing of setting is in the sequence of fast speed rotation, slow speed rotation and instantaneous speed rotation.

Yet another object of the present invention is to provide an improved structure of a control switch of a food processor, wherein the fully automatic control key is provided within the disc, facilitating the mounting of the wires of the integrated circuit for the IC program.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the finction and arrangement of the elements described without departing from the scope of the invention as set forth in the appended claims.

Figure 2:
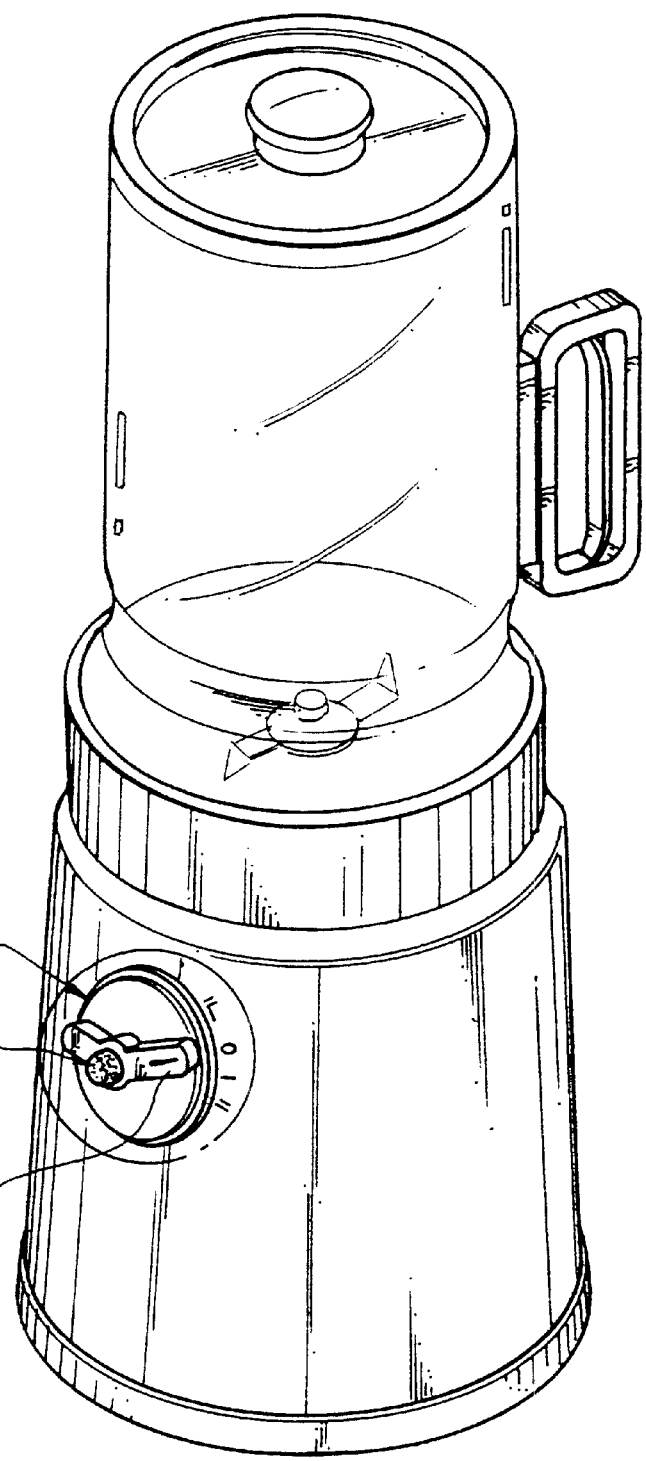
FIG. 2 is a perspective view of a preferred embodiment of the present invention.

Referring to FIG. 2, there is shown a disc-type rotating switch 1. The rotating switch 1 comprises a stop button, speed I rotation, speed II rotation, and an instantaneous rotation. The rotating switch 1 is in combination with a single fully automatic control key 2 which contains an IC program positioned at the central position of the rotating shaft 11 of the rotating switch 1. The control key 2 is operated by pressing of the key. For instance, the first pressing of the key 2, which enables automatic mode and then stops (with a warning), or in the course of automatic operation, the key 2 is pressed once to cause the rotation to stop.

Figure 1:
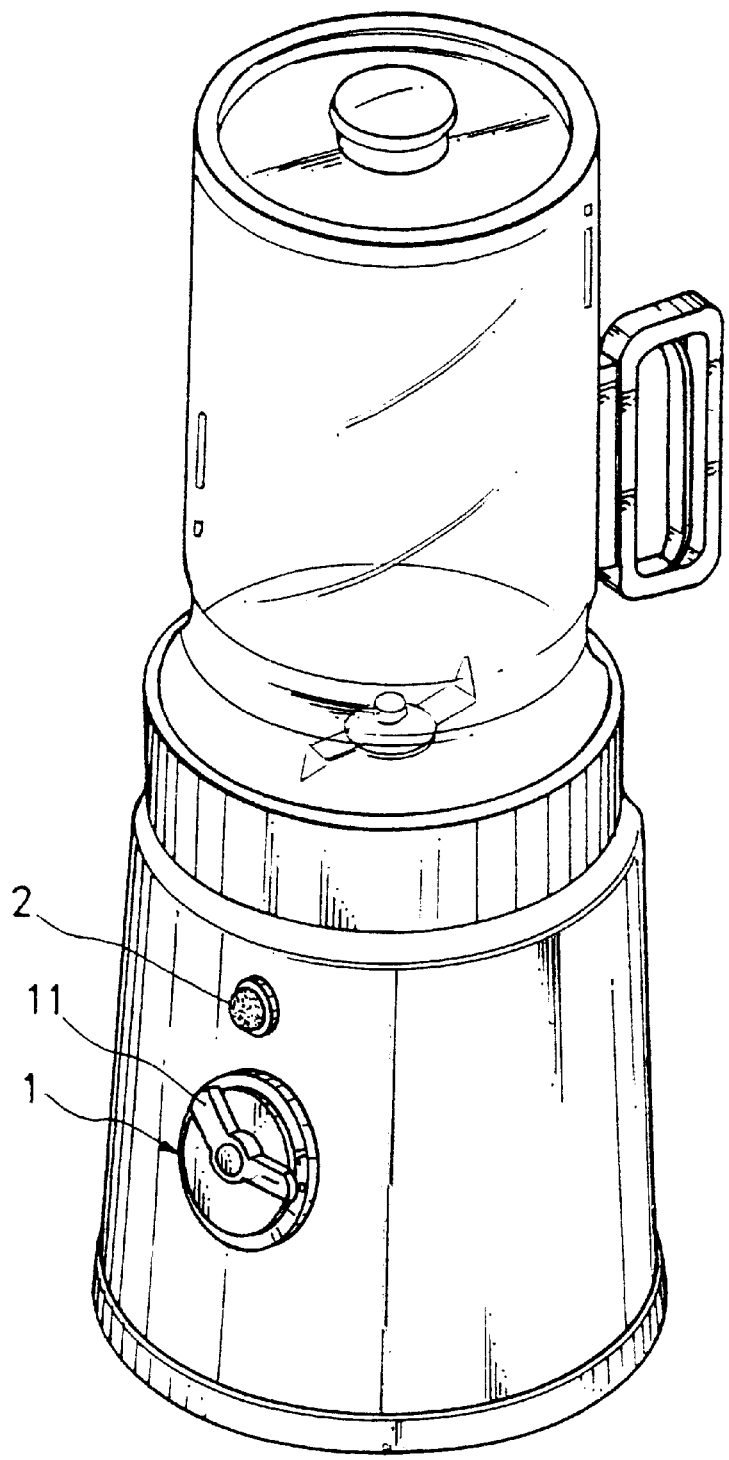
FIG. 1 is a perspective view of a conventional food processor.
Figure 3:
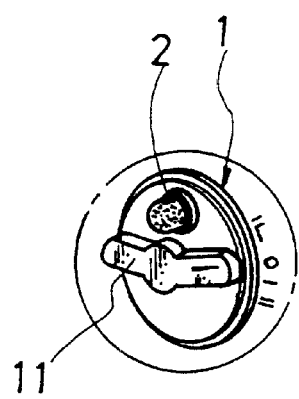
FIG. 3 is another perspective view of another preferred embodiment of the present invention.
Figure 4:
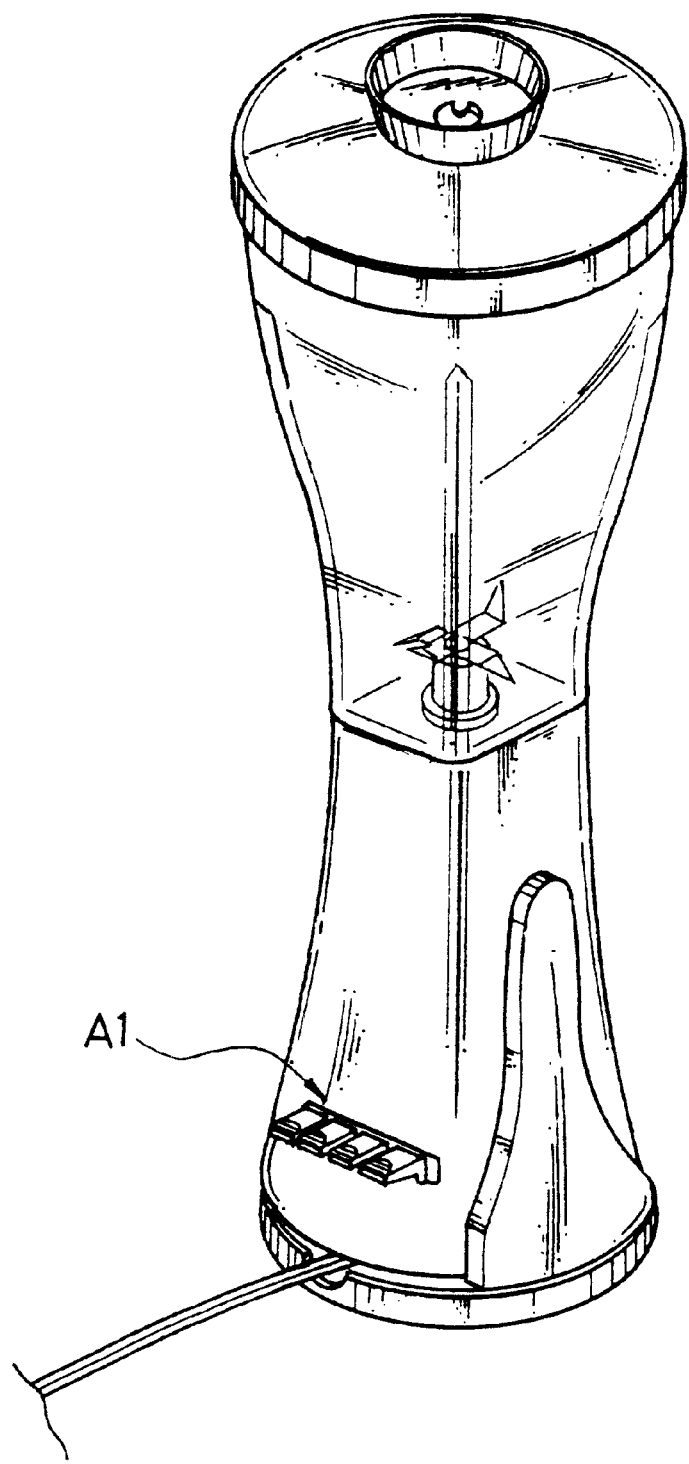
FIG. 4 is a perspective view showing the external view of the present preferred embodiment in accordance with the present invention.

As shown in FIG. 3, the automatic control key 2 can be positioned at an appropriate position of the rotating switch 1, or may not be positioned within the rotating switch 1. As shown in FIG. 4, the position of the control key 2 is positioned at a place where the wires of the circuit board do not affect the control switch 1.

Figure 5:
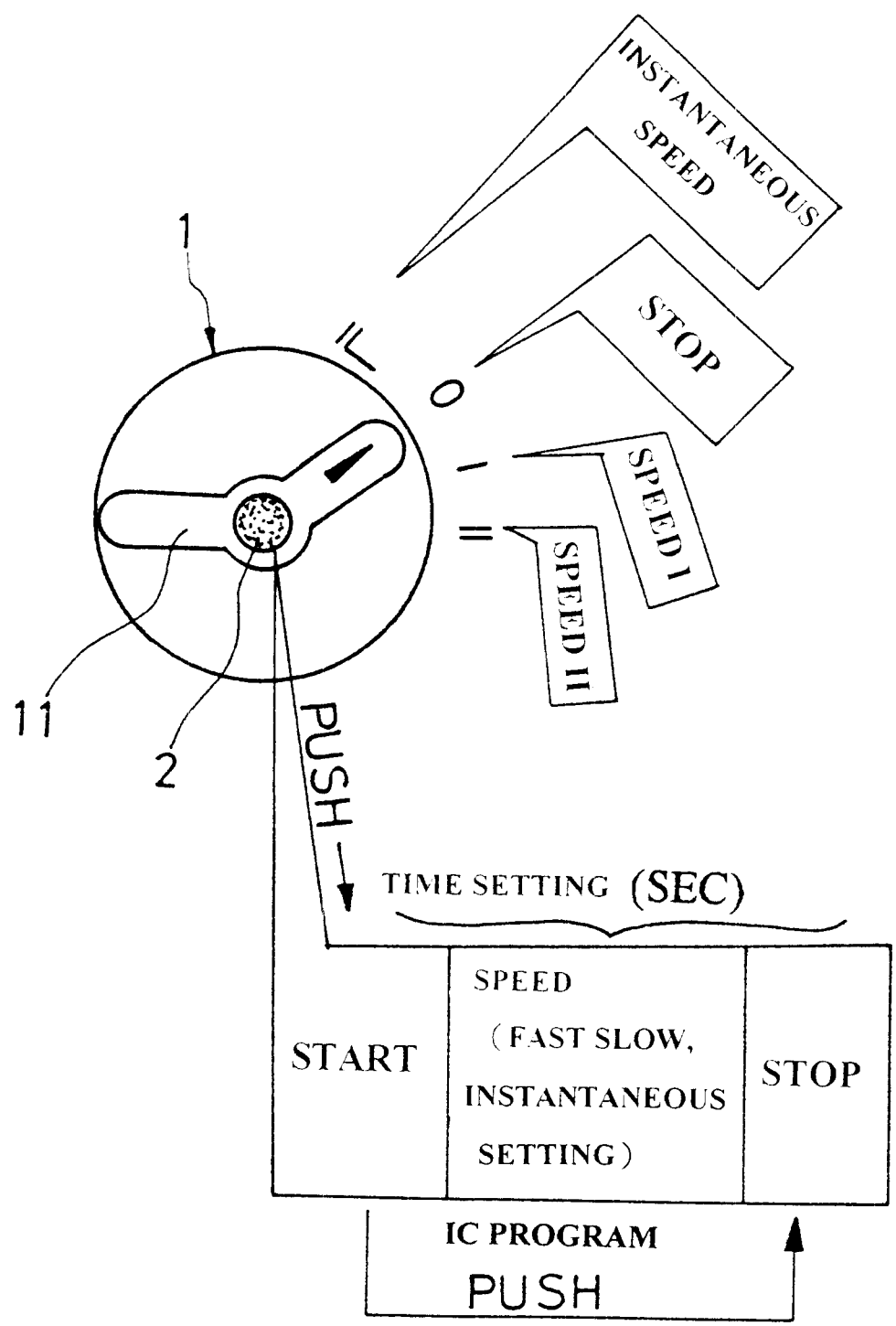
FIG. 5 is schematic view of the fully automatic control key in accordance with the present invention.

Referring to FIG. 5, there is shown the operation of the fully automatic control key 2. The operation steps are as follows:

(a) Start (initial): The key is pressed and the operation starts;

(b) Fast speed rotation, slow speed rotation setting: presetting a time to provide a fast speed rotation and a slow speed rotation. This will allow a food processor to change speed of rotation instantaneously;

(c) Instantaneous rotation setting: provide setting to start rotation and to stop rotation. This provides the effect of re-mixing or another cutting of food action.

(d) Stop action: This provides two actions, either stop the rotation when the entire processing is completed or stop rotation when the control switch is pressed;

(e) Time setting: enables the setting of time for the start operation, fast speed rotation, slow speed rotation and instantaneous rotation. In accordance with the present invention, the setting of the logic mechanism is in fast speed rotation, slow speed rotation and instantaneous speed rotation.

In accordance with the present invention, the advantages are as follows:

(i) The control key does not occupy space and will not affect the control switch, and the operation of the key is fully automatic.

(ii) No monitoring of the food processor is needed as the control key provides automatic operation.

(iii) The operation can be completed within a preset time. Most importantly, after the operation sequence is completed, the operation is stopped automatically (iv) The stop setting can be used in the operation. That is when the stop button is pressed, the rotation is stopped.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An unproved structure of a control switch for a food processor having a fully automatic control key and a disc-type rotating switch mounted with a stop button, speed I button, speed II button, and an instantaneous speed button, characterized in that the fully automatic control key is preset by means of an IC program located within a center position of a rotating shaft of the rotating switch and is controllable by pressing of the key, a logic mechanism of the operation includes a start action, in operation by pressing the key; a fast and slow setting, an instantaneous setting, in operation in rotating, stopping, rotating and stopping sequence; a stop action, including automatic stopping after operation has been completed and stopping action when the stop button is pressed; and a timing setting, allowing time setting of start action, fast speed rotation, slow speed rotation, instantaneous speed rotation, and stop rotation, and the timing of setting is in the sequence of fast speed rotation, slow speed rotation and instantaneous speed rotation.

2. The control switch of claim 1, wherein the fully automatic control key is provided within the disc, facilitating the mounting of the wires of the integrated circuit for the IC program.

3. The control switch of claim 1, wherein the setting of the logic mechanism is in fast speed rotation, slow speed rotation and instantaneous speed rotation.

* * * * *